United States Patent [19]
Lodge

[11] Patent Number: 5,464,643
[45] Date of Patent: Nov. 7, 1995

[54] LOW FAT FRIED SNACK

[75] Inventor: Richard W. Lodge, Cincinnati, Ohio

[73] Assignee: The Procter & Gamble Company, Cincinnati, Ohio

[21] Appl. No.: 164,583

[22] Filed: Dec. 9, 1993

Related U.S. Application Data

[63] Continuation of Ser. No. 438,275, Nov. 16, 1989, abandoned, which is a continuation-in-part of Ser. No. 411,353, Sep. 22, 1989, abandoned.

[51] Int. Cl.$^6$ .............................. A21D 13/00; A21D 8/02
[52] U.S. Cl. .......................... 426/439; 426/549; 426/808
[58] Field of Search ................................ 426/439, 549, 426/808

[56] References Cited

U.S. PATENT DOCUMENTS

| | | | |
|---|---|---|---|
| 3,597,227 | 8/1971 | Murray et al. | 99/100 |
| 3,849,582 | 11/1974 | Blagdon | 426/808 |
| 4,608,264 | 8/1986 | Fan et al. | 426/438 |
| 4,770,891 | 9/1988 | Willard | 426/808 |
| 4,869,911 | 9/1989 | Keller | 426/94 |

FOREIGN PATENT DOCUMENTS

| | | |
|---|---|---|
| 367031 | 5/1990 | European Pat. Off. . |
| 170437 | 10/1983 | Japan . |

OTHER PUBLICATIONS

Roy L. Whistler, James N. Bemiller, Eugene F. Paschall, Starch: Chemistry and Technology, Academic Press Inc. 1984, pp. 611–617.

*Primary Examiner*—Jeanette Hunter
*Attorney, Agent, or Firm*—Rose Ann Dabek; J. C. Rasser

[57] ABSTRACT

A process for preparing low fat shaped snack products having a light, crispy, crunchy texture is disclosed. A dough is formed from 50% to 70% flour, preferably potato flour, at least 3% hydrolyzed starches and a relatively low level of water (20% to 40%). This dough is formed into a sheet from which snack pieces are cut. The snack pieces are fried to provide a snack having 20% to 32% fat and having more and better flavor.

19 Claims, No Drawings

LOW FAT FRIED SNACK

This is a continuation of application Ser. No. 07/438,275, filed on Nov. 16, 1989, now abandoned, which is a continuation-in-part of application Ser. No. 07/411,353, filed Sep. 22, 1989, now abandoned.

TECHNICAL FIELD

This application relates to an improved fried snack product which is lower in fat than other fried snacks made from doughs. In particular, this application relates to a process for preparing such products from a dough containing hydrolyzed starches, e.g. maltodextrin or corn syrup solids (D.E. of 5 to 30) and relatively low levels of water.

BACKGROUND OF THE INVENTION

A wide variety of starch and protein-based snack food products are presently available to the consumer. Many of these products are in the form of chips, strips, and extruded tubular pieces. Some of these products are expanded or puffed and contain a cellular or honeycombed internal structure. In addition, most of the present-day snack products contain a fairly high level of fat, either in the form of separately added ingredients, such as cheese, or in the form of fats imparted to the product during cooking, as in the case of corn or potato chips. Fat improves the flavor and palatability of these products. However, it also increases the caloric value of the product. Accordingly, it would be desirable to provide low fat snack products which have an attractive appearance, texture and taste.

There have been several attempts at lowering the fat content of potato chips and of potato snacks made from doughs. One method involved coating chips with an aqueous dispersion of a high amylose starch. This is said to produce a potato chip with minimal oil pick-up and low variation in the amount of oil absorbed. (see RE 27,531 of U.S. Pat. No. 3,597,227 issued to Muray, et al., 1971). Coating of breaded or batter food products with a film forming agent such as gelatin or starches is also said to lower oil absorption by the foods when they are fried (U.S. Pat. No. 4,511,583 issued to Olson, et al, 1985).

An alternative coating of raw starchy foods was described in U.S. Pat. No. 4,058,631 (Roan, 1977) which involves coating the food surface with an aqueous solution of alpha amylase enzyme. This is said to lower the fat absorption of the product during frying. The amylase attacks starch molecules forming maltose, dextrins and other smaller starch fragments.

Alpha amylase enzymes have also been added to a batter of potato solids from which a snack food is produced. The enzyme hydrolyzes the starch molecules, thereby increasing the solids content and reducing the viscosity of the batter. Fried potato snacks made from this batter are said to have a lower oil content than normal. Example 3 shows an average of 14.5% fat for amylase coated snacks and 17.2% for the control product.

While these treatments are said to lower the oil content of the final product, they are not controlled reactions. Enzymes act on the starch present in the batter but they hydrolyze starch in a random manner. Reaction time, temperature, water content and type of starch reacted with the enzyme all have an effect on the composition and physical properties of the final batter from which the snack is made.

A predictable way to lower the fat content of fried snack products, particularly potato snacks, is desirable. Moreover, since the solids content, degree of hydrolysis and the water content of the dough also affect the browning and the texture of the product, a way to control these parameters is also needed.

It is therefore an object of this invention to make a fried potato snack with a lower fat content (between about 20% to about 32%) which has the same lubricity and texture as one with a higher fat content.

It is a further object of this invention to make a fried potato snack which produces a uniform product in a controlled process.

It is a further object to promote flavor development through increasing the reducing sugar browning reactions which occur during frying in the fried snack product.

DISCLOSURE OF THE INVENTION

The present invention relates to an improved lower fat fried snack product and a process for it.

This process comprises the steps of:
  (a) forming a sheetable dough comprising:
    (1) from about 50% to about 70% of a source of starch based flour;
    (2) at least about 3% hydrolyzed starches having a DE of from about 5 to about 30;
    (3) from about 0% to about 5% emulsifier;
    (4) from about 20% to about 40% added water;
  (b) forming the dough into a sheet;
  (c) cutting snack pieces from the sheet; and
  (d) frying said snack pieces.
The snack pieces are fried at a temperature sufficient to form snack products having a light, crispy, crunchy texture, improved flavor and a fat content of from about 20% to about 32%. This is a lower fat content than most conventional fried snacks. If desired, the lubricity of the snack can be further enhanced by increasing the fat content of the snack to 44% by spraying oil on the snack.

A particularly important aspect of the process of the present invention is the inclusion of hydrolyzed starches in the dough. The use of hydrolyzed starches e.g., maltodextrins or corn syrup solids, allows the dough to be formed into a sheet, even at relatively low levels of water. The lower water level doughs produce a fried snack product that contains less fat than corresponding doughs made with higher water levels. In addition, the inclusion of hydrolyzed starches in the product improves the flavor of the snack. It is believed that the reducing sugars added with the hydrolyzed starches enhance flavor formation during frying. These same hydrolyzed starches added to the doughs provide lower fat products without a reduced perception of lubricity or significant difference in texture from higher fat containing products.

All percentages and proportions are "by weight" unless otherwise specified.

A. Dough Formation

A particularly important aspect of the process of the present invention is the dough. This dough is formed from a combination of starch based flour, water, hydrolyzed starches optionally, but preferably, an emulsifier, as well as other optional ingredients to be described hereafter. The composition of this dough has two significant effects. One relates to the ability to process the dough into a sheet from which are subsequently formed snack pieces of predetermined shape and size which are then fried to form thin, crisp, shaped snack products. The other relates to the textural and flavor features of the resulting fried snack product. Snack products prepared according to the process of the present invention have a relatively light, crunchy texture. As used herein, the term "crunchy texture" refers to a snack that exhibits a crisp and crunching sensation for the first of several chews.

An important component of this dough is a starch based flour. Potato flour is the most preferred source of starch based flour. Suitable sources of potato flour include, dehydrated potato flakes and granules, mashed potato materials, and dried potato products. Other tuber and grain flours such as tapioca, peanut, wheat, oat, rice, and soy meal can be used in the dough. These starch based flours can be blended to make snacks of different composition and flavor.

Suitable starches can be used in combination with the potato flour. Examples of such materials are potato starch, tapioca starch, cornstarch, oat starch, rice starch and wheat starch. Most preferably these starches are cooked so the starch has gelatinized and then are dried and milled to make a flour. These starches are called pregelatinized starches. For example, potato flour is at least 90% pregelatinized starch. Preferred flours contain at least 80% pregelatinized starch.

Hydrolyzed starches are also a key ingredient for the processability of the doughs of the present invention which have relatively low water levels. In the absence of hydrolyzed starchs, low moisture levels in the dough can prevent formation of a continuous, smooth extensible dough sheet and can hinder subsequent expansion of the dough pieces during frying, even if the dough can be sheeted. It also affects the elasticity of the dough. In addition, low moisture doughs tend to produce a harder and more brittle texture in the resulting snack products. It has been surprisingly found that the low moisture doughs of this invention can be sheeted and fried with relative ease.

As used herein, the term "hydrolyzed starches" refers to oligosaccharide-type materials that are typically obtained by acid or enzymatic hydrolysis of starches, preferably corn starch. Suitable hydrolyzed starches for inclusion in the dough include maltodextrins and corn syrup solids.

The hydrolyzed starches for inclusion in the dough have Dextrose Equivalent (D.E.) values of from about 5 to about 30, preferably from about 10 to about 20 . Maltrin® M050, M100, M150, M180, M200, and M250 (available from Grain Processing Corporation, Iowa) are preferred maltodextrins. The D.E. value is a measure of the reducing equivalence of the hydrolyzed starch referenced to dextrose and expressed as a percent (on a dry basis). The higher the D.E. value, the more reducing sugars are present.

Hydrolyzed starches are included in the dough in an amount of at least about 3%, with a usual range of from about 3% to about 15%. Preferably, hydrolyzed starches are included in an amount of from about 5% to about 12%.

As previously alluded to, another important characteristic of the dough of the present invention is its water content. As used herein, the term "added" refers to water which has been added to the dry dough ingredients. Water which is inherently present in the dry dough ingredients, such as in the case of the sources of flour and starches, is not included in the added water. The level of water in flours and starches is usually from about 3% to about 8%. However, if the maltodextrin or corn syrup solids are added as a solution or syrup, the water in this syrup or solution must be accounted for as "added water". The doughs of the present invention can comprise from about 20% to about 40% added water. Preferably, these doughs comprise from about 23% to about 35% added water.

This low level of water in the dough along with the addition of hydrolyzed starches to the doughs provides doughs which can form cohesive sheets. In addition, the low moisture level of the doughs of the present invention are important in reducing the oil content of the final fried snack pieces.

Emulsifiers can optionally be included in doughs of the present invention, typically in minor amounts up to about 5% by weight, preferably from about 0.5% to about 3%, and most preferably from about 1.5% to about 2.5%. Emulsifiers are used as a sheeting aid to avoid overworked sticky doughs and to reduce puffing and blistering in the fried product. Lower moisture doughs, when fried, typically yield harder snack products. To make products with textures similar to those made from higher moisture doughs, the level of emulsifier is typically reduced.

Preferred emulsifiers are mono- and di- glycerides of saturated and unsaturated fatty acids, and in particular mono- and di-glycerides of stearic and palmitic acids. Sucrose mono- and diesters of saturated and unsaturated long chain fatty acids can also be used. Other emulsifiers such as polyglycerol esters, polyethoxysorbitan esters, can also be used.

Salt, flavorings, and/or seasonings can also be optionally included in the dough or sprinkled on the surface of the snack after frying.

The dough of the present invention can be prepared by any suitable method for combining together the previously described ingredients. Typically, a loose, dry dough is prepared by thoroughly mixing together the flour, hydrolyzed starches, emulsifier, flavoring (optional) with sufficient added water to obtain the previously defined hydrolyzed starch and water levels. Preferred devices for mixing together these dough ingredients are conventional mixers. Hobart® mixers are used for batch operations and Turbolizer® mixers can be used for continuous mixing operations. However, extruders can also be used to mix the dough and to form the sheets or shaped pieces.

B. Sheeting, Snack Piece Formation and Frying

Once prepared, the dough is then formed into a relatively flat, thin sheet. Any method suitable for forming such sheets from starch based doughs can be used. For example, the sheet can be rolled out between two counter rotating cylindrical rollers to obtain a uniform, relatively thin sheet of dough material. Any conventional sheeting, milling and gauging equipment can be used.

Doughs of the present invention are usually formed into a sheet having a thickness of from about 0.015 to about 0.035 inches (from about 0.038 to about 0.09 cm), and preferably to a thickness of from about 0.015 to about 0.025 inches (from about 0.038 to about 0.062 cm).

The dough sheet is then formed into snack pieces of a predetermined size and shape. These snack pieces can be formed using any suitable stamping or cutting equipment.

The snack pieces can be formed into a variety of shapes. For example, the snack pieces can be in the shape of ovals, squares, circles, a bowtie, a star wheel, or a pin wheel.

The snack pieces are fried. Preferably the snacks are prepared by a continuous frying method and are constrained during frying. An apparatus as described in U.S. Pat. No. 3,626,466 (Liepa, 1971) can be used. The dough pieces are cut from the sheet, shaped using a movable, apertured mold half to shape the cut dough pieces and then held during subsequent frying by a second apertured mold half. A reservoir containing a frying medium is used. The shaped, constrained pieces are passed through the frying medium until they are fried to a crisp state with a final moisture content of about 0.5% to about 4% water.

Continuous frying or batch frying of the snack pieces in a non-constrained mode is also acceptable. In this method the pieces are immersed in the oil on a moving belt or basket.

If desired, the snack pieces can be fried to moisture contents of 10% or less and then heated with hot air, superheated steam or inert gas to lower the moisture level to 4% or less. This is a combined frying/baking step.

Typical frying medium include fats and oils derived from animal and vegetable sources. Any hydrogenated or unhydrogenated fat can be used. These include corn oil, soybean oil, palm oil, cottonseed oil, canola oil, rapeseed oil, sunflower seed oil, lard, tallow, peanut oil, among others. Synthetic triglycerides can also be used, including low calorie or zero calorie fats, e.g. polyol polyesters of fatty acids such as sucrose polyesters, etc. The snack pieces are fried at temperatures between about 300° F. (148° C.) and 450° F. (232° C.). The exact fry time is controlled by the temperature of the oil and the starting water content. The fry time and temperature is easily determined by one skilled in the art.

The snack products made from this process typically have from about 20% to about 32% fat. Preferably, the fried snacks will have from about 23% to about 28% fat content.

If a higher fat level is desired in the snack product to further improve the lubricity of the snack, oil can be sprayed onto the snack product when it emerges from the fryer, or when it is removed from the mold used in constrained frying. Any number of unhydrogenated or partially hydrogenated oils, such as soybean, cottonseed, peanut, corn, sunflower, canola, etc., can be sprayed onto the snack product. Generally these oils should be predominantly liquid at room temperature, since they are easier to spray and do not solidify on the snack product giving a waxy mouth impression as a more solid fat would do. Lower molecular weight oils, i.e. those containing short chain fatty acids can also be used for this purpose. These lower molecular weight oils are not ordinarily used in frying because of their low volatility and flash points. Polyol polyesters of fatty acids can also be used, as can synthetic triglycerides. These include low calorie and nonabsorbable fats such as sucrose polyesters. See for example, Mattson et al U.S. Pat. No. 3,600,186 and Jandacek U.S. Pat. No. 4,005,195 which describe these fats. Preferably the oils for spraying will have an iodine value greater than 75, and most preferably above 90.

Oils with characteristic flavors or highly unsaturated oils can be sprayed on the snack product. Oils such as olive oil, avocado oil, safflower oil, sesame oil, walnut oil or peanut oils can be used. In addition, oils with added flavors can be used. These include butter flavored oils, natural or artificial flavored oils, herb oils and oils with garlic or onion flavors added. This is a way to introduce a variety of flavors without having the flavor undergo browning reactions during the frying. It also avoids adding the flavor to the dough and having the flavor react with or leach into the oil during the frying process. This method can be used to introduce healthier oils which would ordinarily undergo polymerization or oxidation during the heating necessary to fry the snacks.

Oil spray can be used to increase the oil content from the 22% to 32% fat content as the snack product emerges from the fryer to as high as 44% oil. Thus a snack product having from 30% to 44% can be made using this additional step.

SPECIFIC EXAMPLES OF PROCESS OF PRESENT INVENTION

The process of the present invention is illustrated by the following specific examples:

EXAMPLE 1

Control Product

A mix consisting of approximately 63.3% potato flour, 35.2% water and 2.5% Duex® emulsifier (a mixture of mono- and diglycerides available from Procter & Gamble, Cincinnati, Ohio) is prepared and mixed to form a loose, dry dough in a continuous Turbolizer® mixer with a residence time of 15 to 60 seconds.

The dough is sheeted by continuously feeding the dough through a pair of sheeting rolls forming an elastic continuous sheet without pin holes. Sheet thickness is controlled to 0.020 inches (0.05 cm). The dough sheet is then cut into oval shaped pieces and fried in a constrained frying mold at 350° F. in cottonseed oil to dryness (about 12 seconds). The resulting product has a crisp, light texture with a fat level of 29.5%. This product is a control product.

EXAMPLE 2

Maltrin® M180 (Grain Processing Corp, Muscatine, Iowa) having a DE of 18 is mixed with water to make a 24% syrup. The syrup is added to potato flour in a mixer as in Example 1 to make a loose, dry dough. The dough has the following composition:

| | |
|---|---|
| M-180 Maltodextrin | 9.0% |
| Water | 28.5% |
| Potato flour* | 60.8% |
| Duex ® emulsifier | 1.7% |

*A mixture of milled potato flakes (90%) and potato granules (10%)

The dough is sheeted to a thickness of about 0.20 in (0.05 cm) and fried as in Example 1.

When fried (in cottonseed oil), the resulting product has a crisp, light texture with a fat level of 22.7%. This product has 6.8% less fat on a product weight basis than the product of Example 1 without the maltodextrin. On a relative basis, this is a 23% fat reduction.

EXAMPLE 3

A dough is prepared from the following ingredients:

| | |
|---|---|
| M-180 Maltodextrin | 9.4% |
| Water | 28.1% |
| Potato flour | 61.3% |
| Duex emulsifier | 1.2% |

The water is added to the mixture of flour, maltodextrin and emulsifier instead of being added with the maltodextrin as a syrup as in Example 2. The dough is mixed and sheeted as in Example 2. When the product is fried at 350° F. in cottonseed oil, the resulting product has a crisp light texture with a fat level of 24.2%. This is a difference of 5.3% in fat level when compared with the control product.

When taste tested against the product of Example 1, the product is preferred for "more flavor" and "more potato" flavor.

EXAMPLE 4

A dough was prepared from the following ingredients:

| | |
|---|---|
| M-180 Maltodextrin | 7.0% |
| Water | 29.2% |
| Potato flour | 62.0% |
| Duex emulsifier | 1.8% |

The maltodextrin is dissolved in water to make a 18.7% syrup. The dough is prepared and sheeted as in Example 2. When fried, the resulting product has a crisp light texture with a fat level of 25.1%. This is 4.4% less fat than the control product.

What is claimed is:

1. A process for making a fried snack comprising the steps of:
   (a) forming a sheetable dough consisting essentially of:
      (1) from about 50% to about 70% of a source of starch based flour comprising a pregelatinized starch;
      (2) at least about 3% hydrolyzed starches having a DE of from about 10 to about 20;
      (3) from about 0.5% to about 5% emulsifier;
      (4) from about 20% to about 40% added water;
   (b) forming the dough into a sheet;
   (c) forming snack pieces of predetermined size and shape from the sheet; and
   (d) frying said snack pieces.

2. The process of claim 1 wherein the dough is formed into a sheet having a thickness of from about 0.015 to about 0.035 inches (from about 0.038 cm to about 0.088 cm).

3. The process of claim 2 wherein said hydrolyzed starch is selected from the group of maltodextrin or corn syrup solids.

4. The process of claim 3 wherein said flour is potato flour selected from the group consisting of potato flakes, potato granules and mixtures thereof.

5. The process of claim 4 wherein said dough contains from 0.5% to about 3% emulsifier.

6. The process of claim 5 wherein said emulsifier is a mixture of mono- and diglycerides of saturated and unsaturated fatty acids.

7. The process of claim 6 wherein the dough comprises at least about 25% to 30% added water.

8. The process of claim 7 wherein the dough comprises from about 55% to about 65% flour.

9. The process of claim 8 wherein the dough sheet is cut into an oval shaped dough pieces.

10. The process of claim 8 wherein the oval shaped dough pieces are constrain fried.

11. The process of claim 8 wherein the dough is fried in an oil selected from the group consisting of hydrogenated or unhydrogenated cottonseed oil, soybean oil, corn oil, tallow, olive oil, canola oil, rapeseed oil, peanut oil and mixtures thereof.

12. A process according to claim 1 comprising the additional step of spraying from about 1% to about 20% oil on the fried snack product wherein said oil has an iodine value of at least 75.

13. A process according to claim 12 wherein said oil is selected from the group consisting of olive oil, avocado oil, safflower oil, sesame oil, walnut oil, peanut oil, cottonseed oil, soybean oil, sunflower oil, canola oil, flavored oils and mixtures thereof.

14. Fried snack pieces having from about 0.5% to about 4% water and from about 20% to about 32% fat made from a dough consisting essentially of:
   (1) from about 50% to about 70% of a source of starch based flour comprising a pregelatinized starch;
   (2) at least about 3% hydrolyzed starches having a DE of from about 10 to about 20;
   (3) from about 0.5% to about 5% emulsifier;
   (4) from about 20% to about 40% added water.

15. The snack of claim 14 wherein said dough comprises from about 1% to about 3.0% of an emulsifier selected from the group of mono- and diglycerides of saturated and unsaturated fatty acids.

16. The snack of claim 15 wherein said emulsifier is a mixture of mono-and diglycerides of stearic and palmitic acids.

17. The snack of claim 16 wherein said snack has a fat content of from about 23% to about 28%.

18. The snack pieces made by the process of claim 1.

19. A snack product made by a process according to claim 12 wherein the oil content is from about 30% to about 44%.

* * * * *